United States Patent
Savchuk et al.

(10) Patent No.: US 9,961,095 B2
(45) Date of Patent: May 1, 2018

(54) SYSTEM AND METHOD FOR EXTRACTING AND PRESERVING METADATA FOR ANALYZING NETWORK COMMUNICATIONS

(71) Applicant: General Dynamics Advanced Information Systems, Fairfax, VA (US)

(72) Inventors: Gene Savchuk, Bethesda, MD (US); Anubhav Arora, Bethesda, MD (US)

(73) Assignee: FIDELIS CYBERSECURITY, INC., Bethesda, MD (US)

( * ) Notice: Subject to any disclaimer, the term of this patent is extended or adjusted under 35 U.S.C. 154(b) by 108 days.

(21) Appl. No.: 14/214,088

(22) Filed: Mar. 14, 2014

(65) Prior Publication Data

US 2015/0264072 A1 Sep. 17, 2015

(51) Int. Cl.
*H04L 29/06* (2006.01)
*H04L 12/26* (2006.01)

(52) U.S. Cl.
CPC ........ *H04L 63/1425* (2013.01); *H04L 43/026* (2013.01); *H04L 43/12* (2013.01); *H04L 63/0227* (2013.01); *H04L 63/1416* (2013.01); *H04L 63/1433* (2013.01); *H04L 43/18* (2013.01)

(58) Field of Classification Search
CPC .................. H04L 63/1425; H04L 63/1433
See application file for complete search history.

(56) References Cited

U.S. PATENT DOCUMENTS

| | | |
|---|---|---|
| 7,315,891 B2 | 1/2008 | Donahue |
| 8,112,800 B1 | 2/2012 | Yang et al. |
| 2003/0110131 A1 | 6/2003 | Alain et al. |
| 2003/0158822 A1 | 8/2003 | Kawaguchi |
| 2004/0093513 A1 | 5/2004 | Cantrell et al. |
| 2004/0103202 A1 | 5/2004 | Hilderbrand et al. |
| 2004/0128554 A1 | 7/2004 | Maher, III et al. |
| 2005/0018618 A1 | 1/2005 | Mualem et al. |
| 2005/0039034 A1 | 2/2005 | Doyle et al. |
| 2005/0055399 A1* | 3/2005 | Savchuk ............. H04L 63/1416 709/203 |

(Continued)

OTHER PUBLICATIONS

United States International Searching Authority, International Search Report and Written Opinion for International Application No. PCT/US14/29426, dated Aug. 19, 2014.

(Continued)

*Primary Examiner* — Mary Li
(74) *Attorney, Agent, or Firm* — LKGlobal | Lorenz & Kopf, LLP (57) ABSTRACT

Systems and methods are provided for advanced persistent threat detection on a network. The method includes capturing data packets from a network and performing layered session decoding on the captured packets. Metadata is extracted from the decoded packets and is stored for analysis. Analysis of the metadata is used to detect advanced persistent threats on the network. The system includes a network and a processor coupled to the network. The processor is configured to capture data packets from the network and perform layered session decoding on the captured packets. Metadata is extracted by the processor and stored in a memory coupled to the processor. The metadata may then be analyzed to detect advanced persistent threats on the network.

14 Claims, 5 Drawing Sheets

(56) References Cited

U.S. PATENT DOCUMENTS

| | | | |
|---|---|---|---|
| 2007/0061276 A1 | 3/2007 | Sato et al. | |
| 2011/0214157 A1* | 9/2011 | Korsunsky | G06F 21/55 726/1 |
| 2012/0240185 A1* | 9/2012 | Kapoor | H04L 63/1425 726/1 |
| 2012/0259993 A1 | 10/2012 | Eidelman et al. | |
| 2013/0117852 A1* | 5/2013 | Stute | H04L 63/1425 726/23 |
| 2015/0096024 A1* | 4/2015 | Haq | H04L 63/145 726/23 |

OTHER PUBLICATIONS

USPTO "Office Action" dated Apr. 27, 2007 in U.S. Appl. No. 10/658,777, filed Sep. 10, 2003.
USPTO "Office Action" dated Jan. 30, 2008 in U.S. Appl. No. 10/658,777, filed Sep. 10, 2003.
USPTO "Notice of Allowance" dated Sep. 24, 2008 in U.S. Appl. No. 10/658,777, filed Sep. 10, 2003.
The International Bureau of WIPO, International Preliminary Report on Patentability for International Application No. PCT/US2014/029426 dated Sep. 24, 2015.
The Directorate of Patents At King Abdul-Aziz City of Science and Technology, The First Substantive Examination Report for Saudi Arabia Patent Application No. 515361000 dated Jul. 14, 2016.
European Patent Office, Extended European Search Report for Patent Application No. 14768424.5-1862 dated Aug. 16, 2016.
European Patent Office, Communication pursuant to Rules 70(2) and 70a(2) EPC for Patent Application No. 14768424.5-1862 dated Sep. 2, 2016.

* cited by examiner

SYSTEM AND METHOD FOR EXTRACTING AND PRESERVING METADATA FOR ANALYZING NETWORK COMMUNICATIONS

CROSS-REFERENCES TO RELATED APPLICATIONS

This application claims the benefit of U.S. Provisional Patent Application 61/784,931 filed Mar. 14, 2013. which is hereby incorporated herein by reference in its entirety.

TECHNICAL FIELD

The technical field relates generally to network communications, and more particularly to preserving network communications for network security and forensics purposes.

BACKGROUND

Network communications within and between organizations transfer a variety of data and vital information. However network communications are also one of the main ways attackers get inside the security perimeter of a network. Modern network security technology deploys many methods to prevent the attackers from causing harm to the organizations and individuals. None of them are perfect, especially today in the era of Advanced Persistent Threat (APT). Modern APTs can be developed and deployed targeting very specific targets and usually such APTs can be very hard to detect and eliminate. Recording the network traffic is one of the common methodologies in the advanced network defense. It is analogous to the security camera—while not optimized for the detection of the threat, it is very useful in the elimination stage, allowing a close examination of the threat-related subset of the traffic with the purpose of determining the root cause and infected network nodes.

The network traffic is ever increasing and that creates a challenge for a traditional network recording methods. For APT sometimes taking around months to fully penetrate the organization, a typical requirement for the network data storage is at least 6 months. For a large enterprise it is usually either impossible or impractical to collect and store the resulting amount of data. Even if the APT infection happens, the traffic caused by this attack is miniscule in comparison with the amount of data the enterprise is forced to store in order to research that attack.

The current invention offers a methodology allowing significantly reducing the amount of data that needs to be stored while keeping all the essential information intact. Furthermore, other desirable features and characteristics of the present invention will become apparent from the subsequent detailed description and the appended claims, taken in conjunction with the accompanying drawings and the foregoing technical field and background.

SUMMARY

A method for advanced persistent threat detection on a network is provided. The method includes capturing data packets from a network and performing layered session decoding on the captured packets. Metadata is extracted from the decoded packets and is stored for analysis. Analysis of the metadata is used to detect advanced persistent threats on the network.

A system for advanced persistent threat detection on a network is provided. The system includes a network and a processor coupled to the network. The processor is configured to capture data packets from the network and perform layered session decoding on the captured packets. Metadata is extracted by the processor and stored in a memory coupled to the processor. The metadata may then be analyzed to detect advanced persistent threats on the network.

DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the subject matter of the disclosure or its uses. Furthermore, there is no intention to be bound by any expressed or implied theory presented in the preceding technical field, background, brief summary or the following detailed description.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language.

Additionally, the following description refers to elements or features being "connected" or "coupled" together. As used herein, "connected" may refer to one element/feature being directly joined to (or directly communicating with) another element/feature, and not necessarily mechanically. Likewise, "coupled" may refer to one element/feature being directly or indirectly joined to (or directly or indirectly communicating with) another element/feature, and not necessarily mechanically. However, it should be understood that, although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment.

Some of the embodiments and implementations are described above in terms of functional and/or logical block components and various processing steps. However, it should be appreciated that such block components may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

Finally, for the sake of brevity, conventional techniques and components related to information security and other functional aspects of the system (and the individual operating components of the system) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention. It should also be understood that FIGS. 1-6 are merely illustrative and may not be drawn to scale.

Over the last several years, organizations have accumulated significant park of automated network appliances in attempt to protect their networks. At the same time, the amount of successful APT attacks is constantly on the rise. There's no paradox here—as much as network security vendors are trying to create automated methods for APT detection, they essentially can only deal with attack vectors and methodologies that have already been exposed and researched. Individuals behind the APT attacks, on the other hand, have all the tactical advantages of a first mover.

After the attack is successful, sooner or later it will be exposed—either by its direct actions or by side effects. The goal of the defenders is to minimize the reaction time, i.e., time required to:

Mitigate the infection;
Come up with counter—measures so the infection won't repeat; and
Recover the damage.

Both steps a) and b) usually require significant efforts from highly-trained experts. Practice shows that recordings of existing traffic can significantly reduce the time required to research the APT behavior. As mentioned before, typically partial recordings from existing automated systems are not enough—the reason the APT has infected the network is because existing appliances didn't detect it in the first place.

The foregoing means that in order to rapidly and efficiently research the network infection—ALL the traffic that happened on the network since the APT became active on the network is required for initial assessment. Assuming that initial "latent" period of the APT can take months or even years this requirement creates a significant burden for most organizations—while human experts can be hired only for the time of investigation and mitigations, the full network recording capabilities should be on premises and operational all the time.

The amount of data that needs to be recorded and indexed in the brute-force approach is enormous. In addition to pure technical challenges it creates additional security and privacy issues in and of itself. If all the traffic is conveniently stored in a large disk array, it presents a target for attackers to break into this storage and steal the data from there.

In other words, what experts see in the current network security tendencies is that there is a shift from storing not enough evidence to storing everything (i.e., overreacting and storing too much data).

The disclosed method stores a sufficient amount of network metadata to significantly improve the incident forensics/response efficiency while keeping the storage manageable. In order to achieve maximum performance it is important to do all the necessary processing, data compression and metadata extraction in-memory, i.e., without using the hard disks as intermediary data storage. The disks, in the indexed database form, should also be used only for a final storage of the indexed network metadata.

One embodiment of the present invention provides a configurable method of storing just enough network metadata to make a post-infection research as efficient as possible without deploying significant monetary and storage resources and introducing additional security and privacy risks.

The method may reassemble complete client-server conversation streams, apply decoders and/or decompressors, and/or analyze the resulting data stream using one or more content scanners. The method may also selectively perform deep packet inspection dealing with individual network packets. The method may further provide one or more layers of content decoding that may "peel off," for example, common compression, aggregation, file formats and/or encoding schemas and may extract the actual content in a form suitable for processing and metadata collection. In addition, the decoders may uncover hidden transport mechanisms such as, for example, IPv6 tunnels or e-mail attachments. The method may operate on real-time network traffic (e.g., including 10 Gbps networks) and may allow, for example, the collection of the several network metadata streams to one final database for cross-reference research. The method may also be deployed next to complete and partial full-packet capture solutions for the purposes of providing indexed access for particular elements of the raw traffic.

The method may be installed, for example, on off-the-shelf Linux Operating System ("OS") and Intel-based hardware, and may allow the appliance to function as a stand-alone network appliance. The method may also utilize one or more Network Interface Cards ("NICs") for packet capturing. The method may also connect to other sources of information, like e-mail and HTTP proxy servers for example. Multiple instances of the method may also run on the appliance.

A machine-readable medium (e.g., CD) may be programmed with the method, for example, to be installed on any Linux running on PC hardware with 64-bit Intel CPU.

Figure 1:
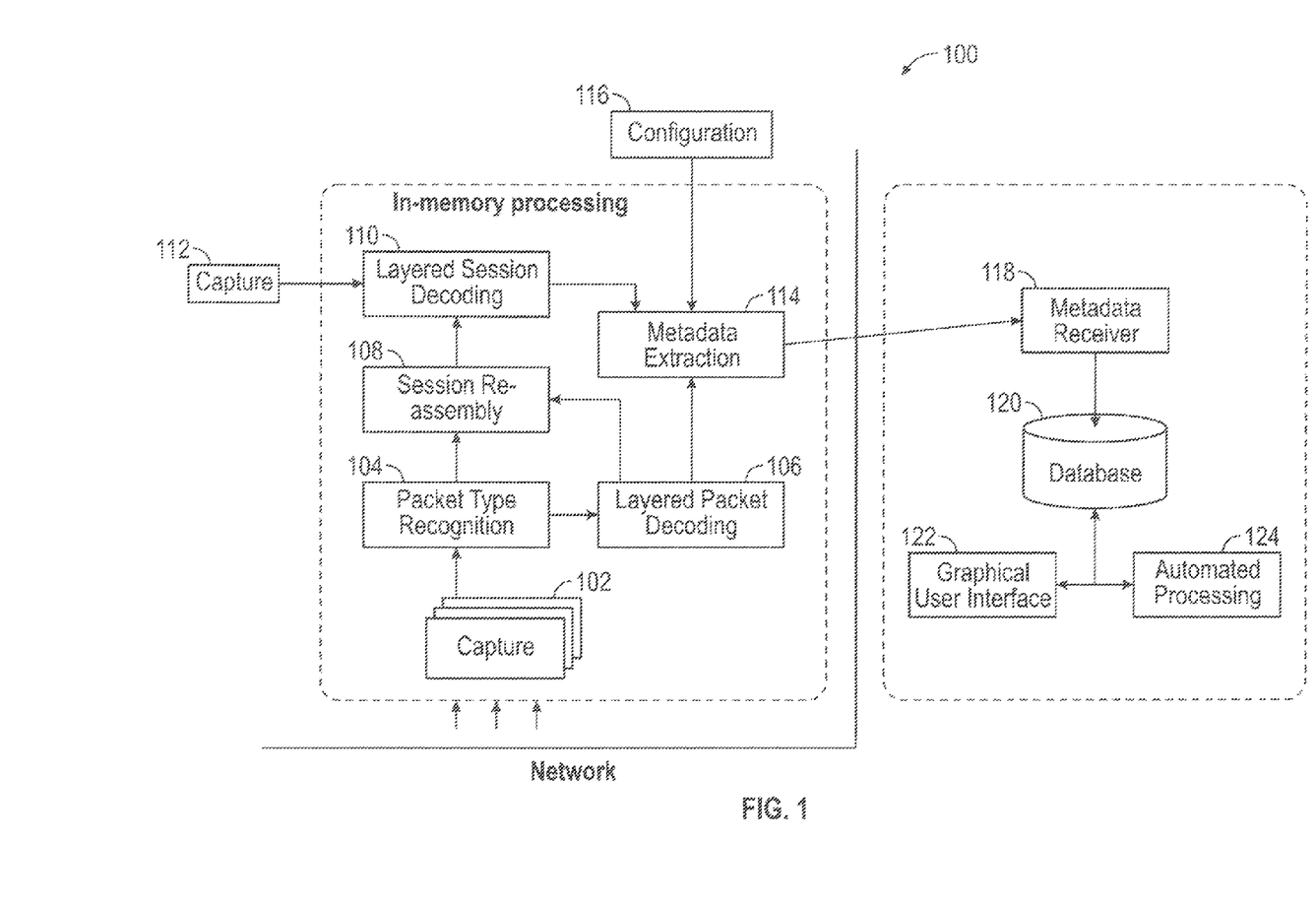
FIG. 1 is simplified block diagram of a system for preserving network communications in accordance with exemplary embodiments.

FIG. 1 illustrates one embodiment of a system in accordance with the invention. As can be seen, the system 100 includes several modules. According to fundamental embodiments of the invention, packets are captured (102) from a network. The packet types are determined (104) and the packets are decoded in block 106. The system may be suitable for a variety of applications, for example, accessing all layers of network traffic including the content of TCP/IP and UDP data exchanges. Packet type information and the decoded packets are sent to block 108 for session reassembly. Next, layered session decoding is performed in block 110. Block 110 may also accept captured (112) data from SMTP mail hub, or Web proxy servers. Metadata is extracted in block 114 in accordance with a configuration profile (116) using the layered session decoding information and layered packet decoding information. This metadata is collected via a metadata receiver 118 which is coupled to a data base 120 for storing the metadata. The stored metadata can them be analyzed via a graphical user interface 122. The operator may analyze the metadata manually or with the assistance of various automated processes 124 to detect advanced persistent threats to the network.

The system 100 digs deep into every network exchange and decodes application protocols and file formats while they are in progress or from off-line source. Conventionally, when the decoding is finished the content of the data itself is usually discarded. All this done in-memory without Disk I/O operations being involved during the whole metadata extraction phase. The system 100 typically stores (120) the metadata information about each network exchange. In addition to the common session attributes like IP addresses and ports, the system is capable of extracting all the application protocols used, IP tunneling if used, user names, file names, HTTP referrers and request URLS, server return codes and so on, as specified in the user configuration. Non-session based protocols like DNS are decoded on per-packet basis and the metadata is sent for storage similar to the session-based protocols.

Since typical network traffic consists of long sessions and file transfers, per-session metadata storage without real content constitutes at least 1/100 compression ratio vs. the raw network traffic and significantly reduces security and privacy risk in addition to compliance requirements usually associated with full data storage. On the other hand, storing the wealth of information about the session itself gives a trained network forensics specialist everything needed to research the network attack in all stages of progress.

The processing steps are:
1) Capture the raw network traffic;
2) Optionally Selectively decode packets (IPv6 tunnels, DNS, etc);
3) Optionally Reassemble sessions from TCP and UDP protocols;
4) Perform the Layered Session Decoding; and
5) Extract the Session metadata in accordance with the Configuration.

Figure 2:
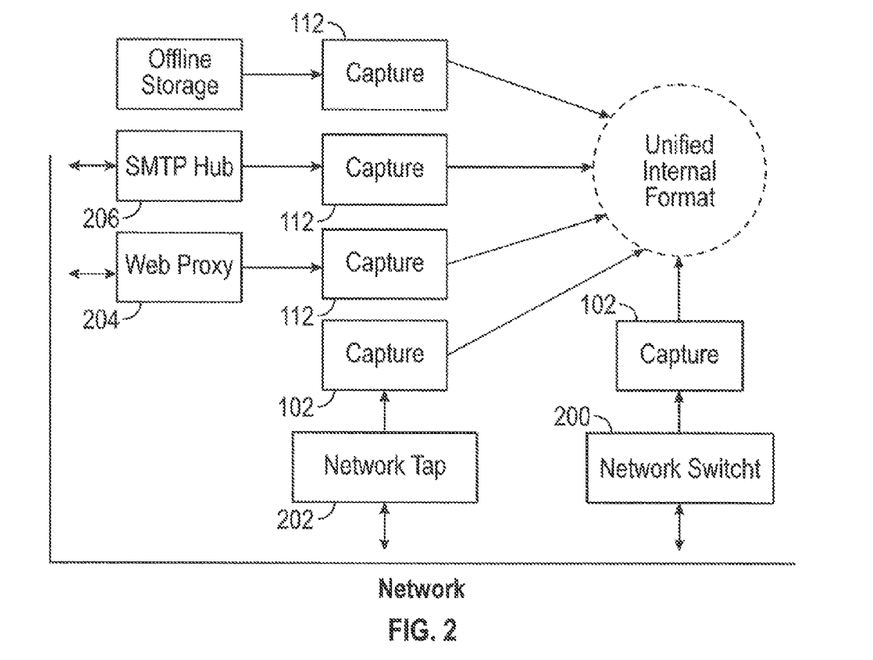
FIG. 2 illustrates the capturing process in accordance with exemplary embodiments.

FIG. 2 illustrates the capturing process in accordance with exemplary embodiments. The purpose of this step is to implement various interfaces with live and off-line data sources with the goal of providing a uniform data representation inside the system.

Different capture modules may be implemented depending on the source of the network traffic. The most common sources are the raw network traffic coming from the Network Switch Span port 200 or the network tap 202; HTTP traffic coming via the ICAP connection from the HTTP Proxy appliance 204 and SMTP traffic coming via SMTP mail hub 206 implementation.

More than one capture method may be used in the same in-memory processing system. Additional capture modules may be also implemented in the future for specific network exchange protocols and off-line storage formats.

Optional Selective Packet Decoding

Figure 3:
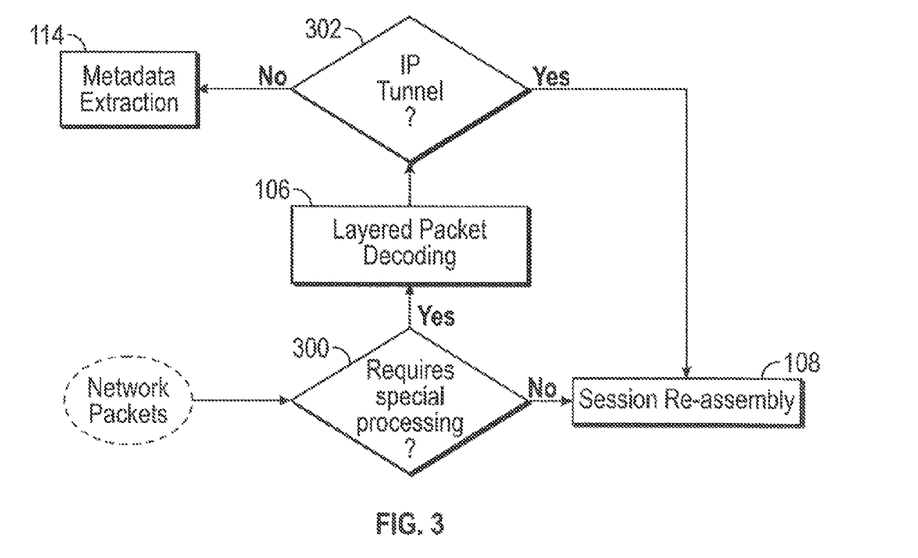
FIG. 3 illustrates the packet processing in accordance with exemplary embodiments.

FIG. 3 illustrates the packet processing in accordance with exemplary embodiments. Certain very important transmissions need to be analyzed on the packet level before attempts are made to assemble them into meaningful sessions for the forensics research. For example, IPv6 is very often being used by APT to obfuscate the network transmissions. Some network exchanges are session-less and should be processed as such. A typical example of this being the DNS protocol. Certain classes of APT and malware rely on DNS for downloading additional software after the initial infection. Accordingly, block 300 determines if special processing is required. If not, the packet is sent directly to session reassembly 108. However, is special processing is required, the layered packet decoding operation 106 is used and block 302 determines if an IP Tunnel was utilized to add tunnel information for session metadata extraction 114, and then routes the packet to session reassembly 108.

The system accommodates those requirements by extracting the important data from DNS requests directly and detecting and decoding the IPv6 tunnels. Obviously this type of processing cannot be done for the session-oriented data exchanges, like HTTP or SMTP.

Optional Reassembly Sessions from TCP and UDP Protocols

Figure 4:
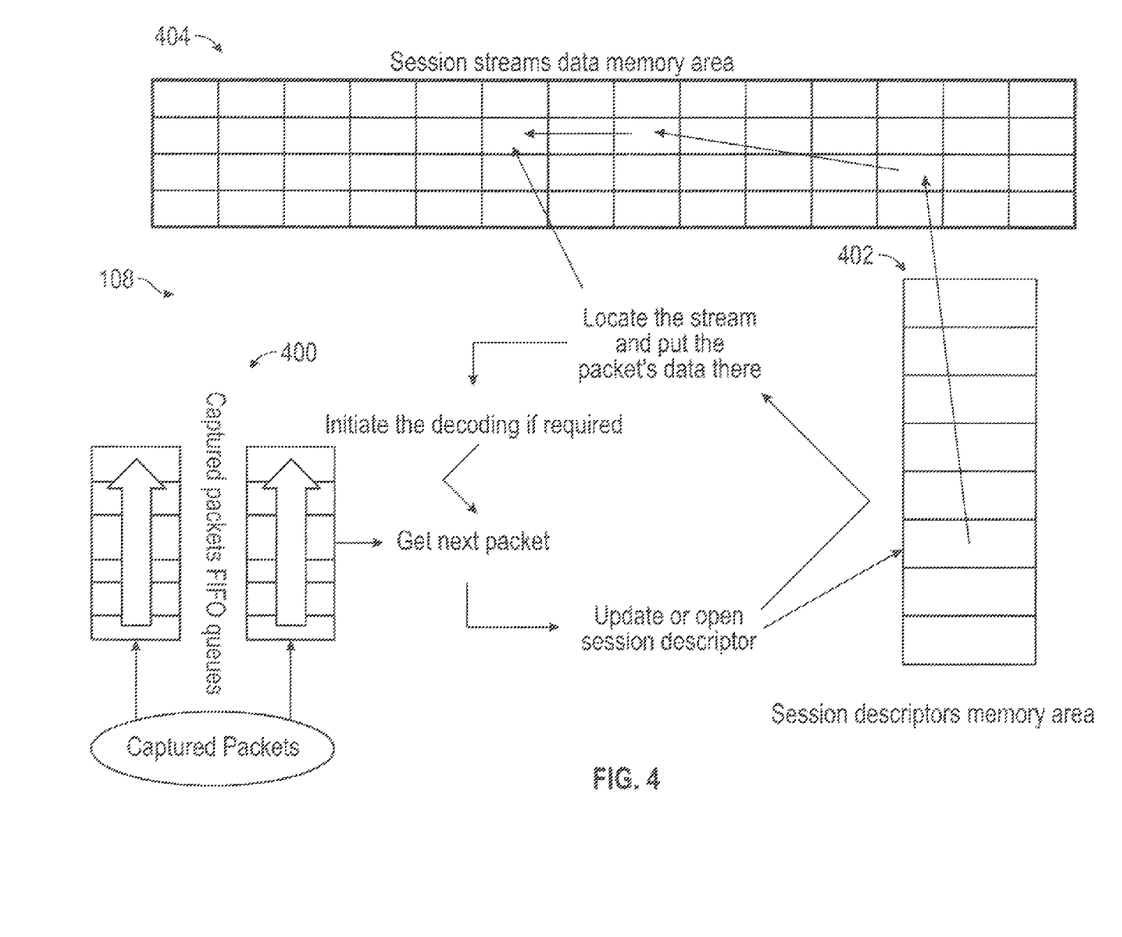
FIG. 4 illustrates the session re-assembly in accordance with exemplary embodiments.

FIG. 4 illustrates the session re-assembly 108 in accordance with exemplary embodiments. When the system captures raw network packets 400, whether directly from the network or from the off-line storage, it compiles streams of singular packets into the logical sessions featuring common characteristics to minimize the amount of the similar information that needs to be stored. For example if the network session consists of 100 packets 1.5 KB each arranged into the TCP/IP file transfer via FTP, the resulting extracted information may consist of the source and destination IP addresses and ports, total length of the session, username/password used, file name, type and length, time of day and date. Those characteristics are common for all the packets involved in the session, resulting in significant compression of information in comparison to recording all the raw packets with their payload.

The system deploys a TCP/UDP reassembly module that keeps track of all the current network streams and adds singular packets from the network together with their payloads into the corresponding streams for further content decoding and metadata extraction. All this processing may be done in memory to be able to perform on live network speeds. The module processes packets one by one from the one or more input queues, each queue representing, for example, a network interface in the promiscuous mode or PCAP file with the stored packet stream, finds an appropriate network stream represented by a descriptor and data area in memory, extracts the data from the packet and put it into the memory data 402 offset and updates the stream descriptor accordingly. Session streams are stored in memory 404. The module may also decide that the particular network stream is closed-based, for example, on processing a specially formatted network packet or the stream condition in general, for example a timeout. In this case the TCP/UDP reassembly module ensures that the stream and its data is fully decoded and erases it from the memory. The data may be erased before the session descriptor, taking care that stray packets and, for example TCP retransmits arriving late and out of order are properly recognized as such in accordance with TCP RFC states. The stream data in memory consists of one or more linked memory "chunks" of fixed size similar to the typical disk file system. New chunks for the data stream are allocated as transmission progresses.

Layered Session Decoding

Figure 5:
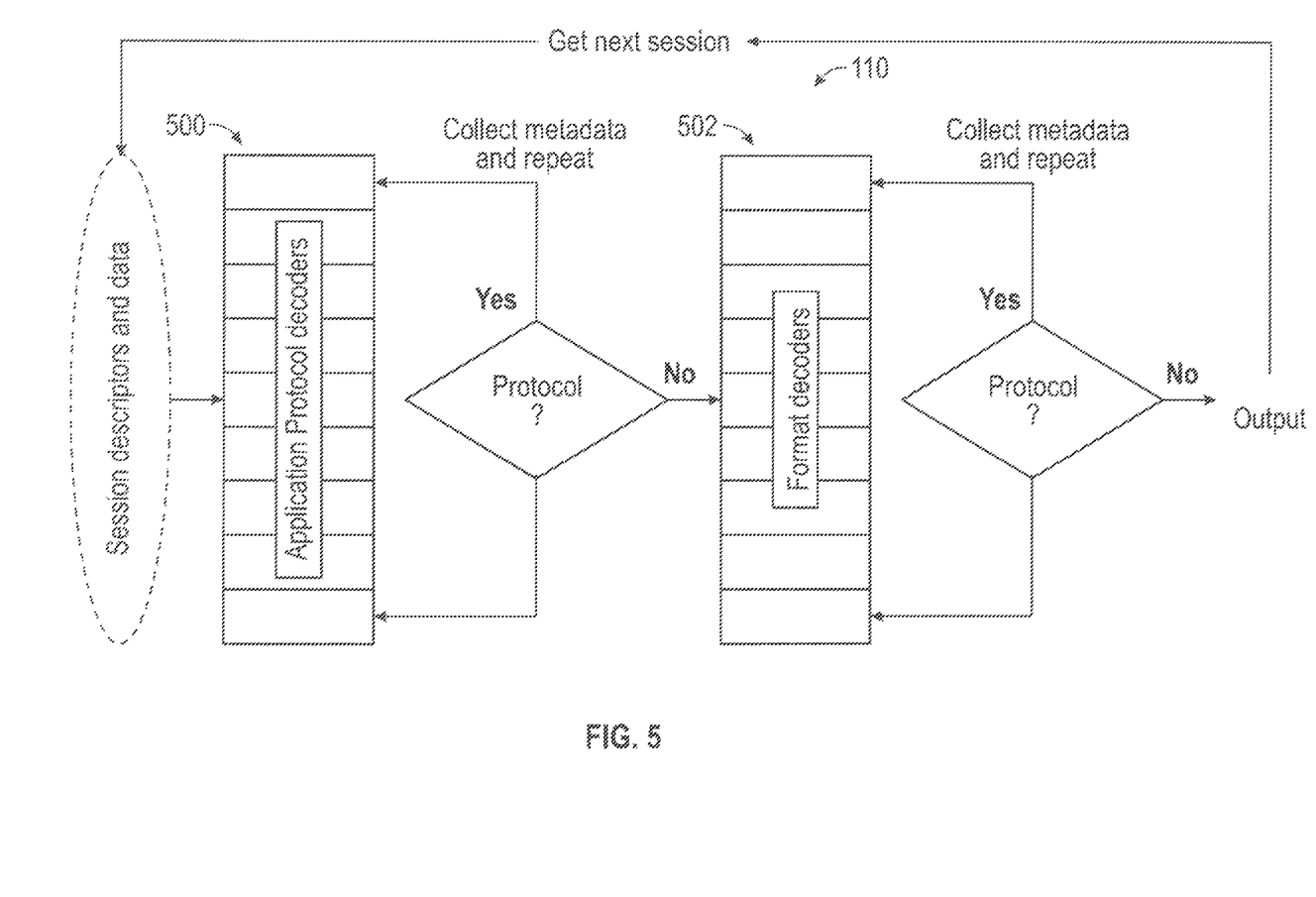
FIG. 5 illustrates the Layered Session Decoding in accordance with exemplary embodiments.

FIG. 5 illustrates the layered session decoding 106 in accordance with exemplary embodiments. Although the very primitive initial metadata is available immediately from the packet information (IP addresses, TCP and UDP ports and similar), an advantage of this is provided when metadata is extracted from the all the data being transferred. In particular, when the previous module (the session re-assembly 108 or the session capture module 112 (as shown on FIG. 1) decides to send a reference for particular session for analysis. The main decoder loop handler relates the session descriptor and the data stream and deploys series of decoders in the loop. The decoding loop happens until none of the decoders can recognize the data anymore. This event triggers the end of the decoding loop. There's logical separation between Application Protocol Decoders 500 and Format decoders 502—mostly because of internal data representation differences. The Protocol Decoders 500 can analyze a client and server stream simultaneously in order to properly process the communication. The Format Decoder 502 typically deals with single buffers extracted from the client-server communication by the Protocol Decoders 500. Such loop structure guarantees that all the data would be properly decoded, even if it was, for example, double-compressed.

Each decoding cycle produces a protocol or format-specific metadata that gets added to the session description. All the processing may be done in memory to facilitate top performance.

Extract the Session Metadata in Accordance with the Configuration

Figure 6:
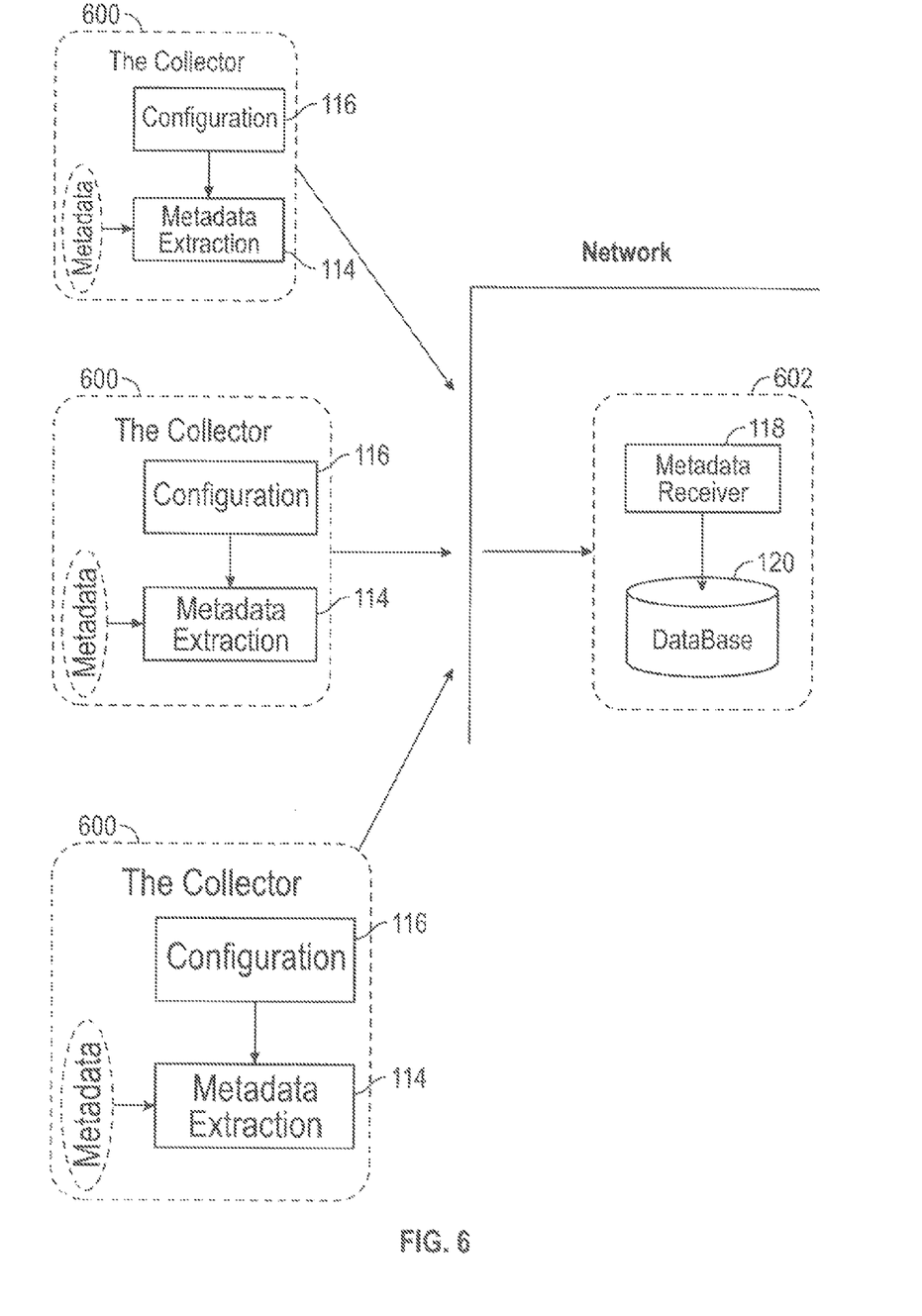
FIG. 6 illustrates the Metadata extraction and storage in accordance with exemplary embodiments.

FIG. 6 illustrates the Metadata extraction and storage in accordance with exemplary embodiments. The metadata may be extracted using multiple sensors 600 as shown. The metadata collected on the previous step is being matched to the user-provided configuration. The entries that are of interest of the user (for example format names, file names and user names but not full HTTP headers) are being converted to key-value pairs and sent to the database for storage.

The Database 120 may be local or remote. In case of the remote database the SSL encryption over the proprietary protocol is being deployed to safely and reliably transfer the data to the destination.

More than one metadata collection system 602 can be deployed on the network, storing the results of the processing in the same database 120. Due to effective 100:1 (or more) compression, the system can be successfully deployed on high-speed network in many-to-one configuration, that's it—multiple Collectors sending the network metadata to the same database for centralized storage and correlation.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth herein.

What is claimed is:

1. A computer-implemented method for protecting a computer network from electronic communication containing malicious code in the form of an advanced persistent threat, comprising executing on a processor the steps of:
    capturing the electronic communication as it is received by a network via the processor to provide captured data;
    determining a packet type for the captured data;
    decoding the data packets to provide decoded packet data;
    reassembling a communication session from the decoded packet data to provide a reassembled communication session;
    performing layered session decoding on the reassembled communication session while the electronic communication is in progress to provide decoded session data;
    extracting session metadata from the decoded session data while the electronic communication is in progress;
    extract packet metadata from the decoded packet data while the electronic communication is in progress;
    storing the session metadata and packet metadata; and
    analyzing the session metadata and packet metadata to detect the advanced persistent threat on the network.

2. The method of claim 1, further comprising the processor capturing data from a network proxy server.

3. The method of claim 1, further comprising the processor capturing data from an SMTP hub.

4. The method of claim 1, further comprising the processor extracting the session metadata in accordance with a configuration.

5. The method of claim 1, further comprising the processor utilizing application protocol decoders when performing the layered session decoding.

6. The method of claim 1, further comprising the processor utilizing format decoders when performing the layered session decoding.

7. A system for protecting a computer network from electronic communication containing malicious code in the form of an advanced persistent threat, comprising:
    a network;
    a processor coupled to the network and configured to;
        capture the electronic communication from the network as it is received to provide captured data;
        determining a packet type for data packets of the captured data;
        decoding the data packets to provide decoded packet data;
        reassembling a communication session from the decoded packet data to provide a reassembled communication session;
        perform layered session decoding on the reassembled communication session while the electronic communication is in progress to provide decoded session data; and
        extract session metadata from the decoded session data while the electronic communication is in progress;
        extract packet metadata from the decoded packet data while the electronic communication is in progress;
    a memory coupled to the processor for storing the session metadata and packet metadata; and
    wherein, the session metadata and packet metadata may be analyzed to detect the advanced persistent threat on the network.

8. The system of claim 7, wherein the processor is further configured to capturing data from a network proxy server of the network.

9. The system of claim 7, wherein the processor is further configured to capturing data from an SMTP hub of the network.

10. The system of claim 7, further comprising the processor extracting the session metadata in accordance with a configuration.

11. The system of claim 7, further comprising application protocol decoders for performing the layered session decoding.

12. The system of claim 7, further comprising format decoders for performing the layered session decoding.

13. A non-transitory computer readable medium for protecting a computer network from electronic communication containing malicious code in the form of an advanced persistent threat, comprising instructions stored thereon, that when executed by a processor, perform the steps of:
    detecting an advanced persistent threat by:
        capturing the electronic communication from a network as it is received via a processor to provide captured data;
        determining a packet type for the captured data;
        decoding the data packets to provide decoded packet data;

reassembling a communication session from the decoded packet data to provide a reassembled communication session;

performing layered session decoding on the reassembled communication session while the electronic communication is in progress to provide decoded session data;

extracting session metadata from the decoded session data while the electronic communication is in progress;

extract packet metadata from the decoded packet data while the electronic communication is in progress; and analyzing the session metadata and packet metadata to detect the advanced persistent threat on the network.

14. The non-transitory computer readable medium embodying a computer program product of claim 13, wherein the advanced persistent threat detection program is further configured to extract the sessions metadata in accordance with a configuration.

* * * * *